CYLINDRICAL COMPENSATING ELECTRODE FOR ELECTROSTATIC LENS OF CATHODE RAY TUBE

Filed Sept. 6, 1962 2 Sheets-Sheet 1

INVENTORS
KENJI SHIMUZU
HIROFUMI SUZUKI
BY
Hill, Sherman, Meroni, Gross & Simpson
ATTORNEYS

CYLINDRICAL COMPENSATING ELECTRODE FOR ELECTROSTATIC LENS OF CATHODE RAY TUBE

Filed Sept. 6, 1962

2 Sheets-Sheet 2

INVENTORS
KENJI SHIMUZU
HIROFUMI SUZUKI
BY
Hill, Sherman, Meroni, Gross & Simpson
ATTORNEYS United States Patent Office 3,243,646
Patented Mar. 29, 1966

3,243,646

CYLINDRICAL COMPENSATING ELECTRODE FOR ELECTROSTATIC LENS OF CATHODE RAY TUBE

Kenji Shimizu and Hirofumi Suzuki, Kawasaki, Japan, assignors to Nippon Columbia Kabushikikaisha (Nippon Columbia Co., Ltd.) Kawasaki, Japan, a corporation of Japan Filed Sept. 6, 1962, Ser. No. 221,812
Claims priority, application Japan, Sept. 11, 1961, 36/33,248; Nov. 11, 1961, 36/40,949
4 Claims. (Cl. 315—16)

This invention relates to a cathode ray tube, and more particularly to a television receiving cathode ray tube which has minor image distortion with small electromagnetic deflection power consumption.

It is usual that the deflection power of the cathode ray tube of a transistorized television receiver amounts to 70% of the whole power consumption, and now it has been desired to decrease this deflection power. To this end, various means have been proposed so as to decrease the deflection power as small as possible in an electromagnetic deflection type cathode ray tube. For example, the diameter of the neck portion of the cathode ray tube was made narrow or the post-acceleration was effected. However, these methods are passive and insufficient solutions to the problem from the basic point of view.

Recently a method has been appreciated as positive means of settling the problem, in which the power consumption is decreased by a so-called scan-magnification wherein an electron beam after deflection by an ordinary deflecting device is further deflected in the scanning condition. There are several methods due to the action of a magnetic lens, electrostatic lens and the like in this scan-magnification. But all these methods have fatal defects such as lens aberration, insufficient deflection angle or insufficient decrease of the power consumption and hence they are not yet actually suitable to be put to practical use.

However, it has become apparent that a cathode ray tube using the electrostatic lens action, particularly a cathode ray tube using the scan-magnification due to an electrostatic multiplex diverging concave lens system can be most available for practical use.

One object of this invention is to provide a cathode ray tube in which a compensating lens is provided to the electrode arrangement forming an electrostatic multiplex concave lens system thereby compensating the distortion at the distortion at the margins of a picture reproduced on the phosphor screen.

Another object of the invention is to provide a television receiving cathode ray tube in which clear and distortionless pictures can be produced on the phosphor screen of the cathode ray tube.

A further object of this invention is to provide an electromagnetic deflection and electrostatic multiplex concave lens type cathode ray tube in which large scan-magnification effect is performed without accompanying an appreciable picture distortion with comparatively small magnetic deflection power consumption.

Other objects, features and advantages of this invention will become apparent from the following description taken in conjunction with the accompanying drawings in which, FIGURE 1 is a schematic diagram showing an example of a cathode ray tube of this invention;

Figure 1:
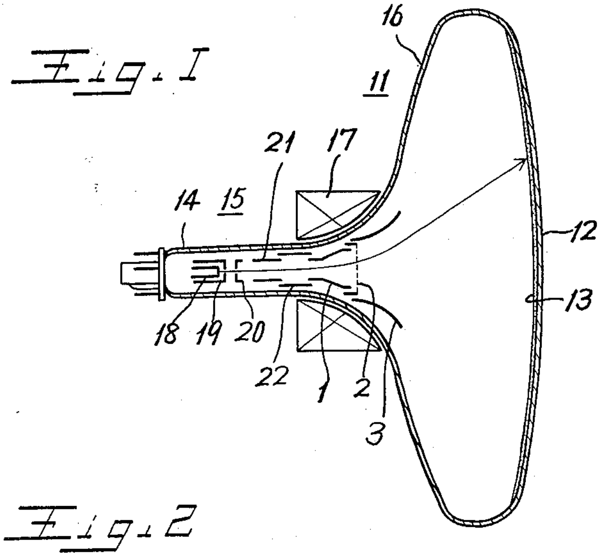

Referring now to FIGURE 1, 11 shows a cathode ray tube proper; a phosphorous screen 13 is formed inside a face portion 12; an electron gun device 15 is provided at a neck portion 14; and a deflection coil 17 is wound around the outer periphery of the connection part of a cone portion 16 and the neck portion 14. The electron gun 15 is provided at the neck portion in such a way that its cathode 18, control grid 19, screen grid 20, acceleration grid 21 and focusing electrode 22 are orderly arranged in the direction of the screen 13 on the same axis along the axis of the tube. Electron beams which are accelerated and focused by the electron gun device 15 are deflected at the deflection region of the deflection coil 17. The deflected beams are scan-magnified by a electrostatic multiplex concave lens system, which will hereinafter be explained in connection with FIGURES 2 and 3. The electrostatic multiplex concave lens system comprises two tubular or cylindrical electrodes 1 and 3 disposed along the axis of the tube and a mesh electrode 2 positioned between the electrodes 1 and 3, and it is mechanically connected to the electron gun device 15.

Figures 2, 3, 4:
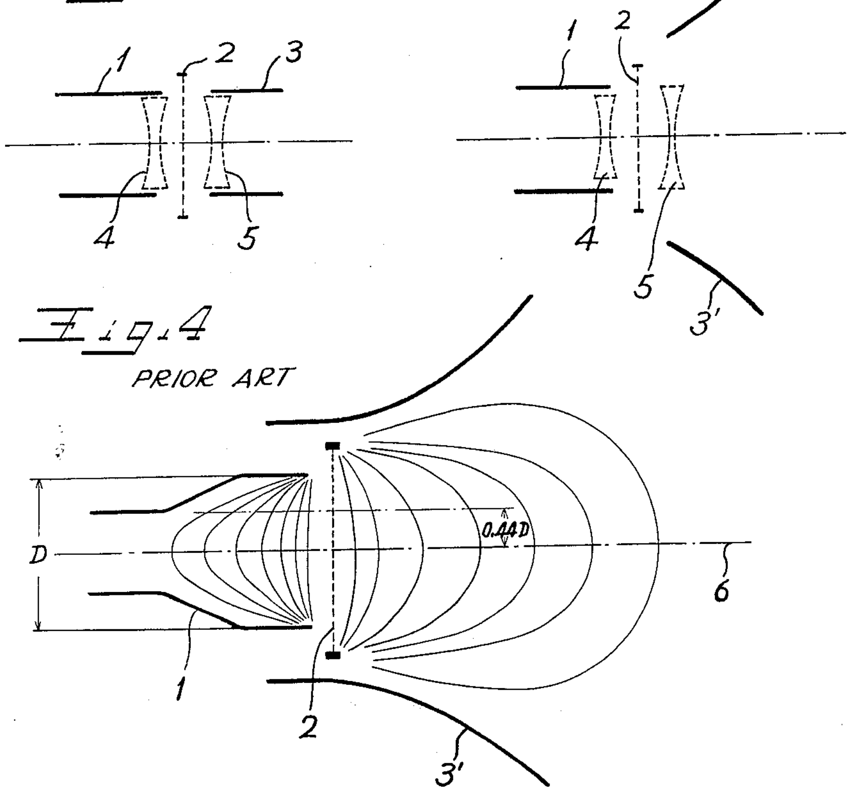
FIGURE 2 shows a basic arrangement of an electrode for scan magnifying electron beam for explaining this invention.
FIGURE 3 is another example of the scan-magnification electrode.
FIGURE 4 shows the electric field distribution of the electrode arrangements shown in FIGURES 2 and 3.

Now we will hereinafter explain the electrostatic multiplex concave lens system with reference to FIGURES 2 and 3. In FIGURES 2 and 3, the cylindrical electrode 1, the mesh electrode 2 and in FIGURE 2 the cylindrical electrode 3 and in FIGURE 3 an electrode 3' formed on the inner side of the cone portion formed by means of evaporation-deposition or painting, are spaced from one another at a predetermined distance, and an equipotential with said accelerating electrode 21 and a higher potential than that applied to the mesh electrode 2 is added to the electrodes 1 and 3 or 3' and further electrostatic concave lenses 4 and 5 are formed respectively between the electrode 1 and the mesh electrode 2 and between the mesh electrode 2 and the electrode 3 and 3'. The electron beam deflected by the deflection coil at the base of the cone portion of the cathode ray tube is further deflected to magnify the deflection angle in the scanning condition by the two electrostatic concave lenses 4 and 5.

It must be noted that the mesh electrode 2 heretofore used has no extended portion essentially in its axis direction from its periphery except its thickness. Therefore, the electric field distribution in such a conventional cathode ray tube is as shown in FIG. 4. In the case where the effective diameter of the electrode 1 is D based upon the electric field distribution diagram, the second differential coefficient on an axis parallel to an shifted from the axis line 6 at a distance of 0.44D is as shown by a curve 7 in FIGURE 5, the abscissa indicating distance Z from the mesh electrode and the ordinate the second differential coefficient $\varphi''$. The second differential coefficient on the axis 6 becomes as illustrated by a curve 8 in FIGURE 6. The second differential coefficients $\varphi''$ of the curves 7 and 8 are both minus and it implies the concave lens effect. Accordingly it will be seen that the electrostatic concave lenses 4 and 5 are respectively formed between the electrodes 1 and 2, and 3 and 2. However, as is apparent from the difference of the curves 7 and 8, the distortion of a picture due to the marginal effect of the electrostatic lens is recognized.

To avoid such a distortion of a picture due to the marginal portion of the lenses, the diameter of the electrostatic lenses can be enlarged to use mainly its center portion. But at least the electrode 1 and the mesh electrode 2 are required to be positioned in the neck portion of a cathode ray tube from their constructional and functional points of view. Furthermore, it is desired to make the diameter of the neck portion as small as possible from a consideration to the increase of the deflection efficiency, so that the diameter of the electrodes 1 and 2 is made small with the result that even the marginal portion of the electrostatic lens, causing the distortion, formed by the electrodes 1 and 2 is compelled to come into the effective deflection field of the electron beam. Therefore, the cathode ray tube heretofore used has disadvantages in that the marginal portion of a picture reproduced on a phosphor screen is deformed to the so-called pincushion or barrel distortion.

This invention is to provide an excellent electromagnetic deflection type cathode ray tube in which such a distortion is compensated and its power consumption is remarkably decreased, being based upon the electrostatic scan-magnification system by employing particular electrostatic multiplex concave lens action.

That is, this invention is to provide a cathode ray tube comprising an electrostatic multiplex, for example doublet concave lens composed of two electrodes including at least one cylindrical electrode and of a mesh electrode which is positioned between the said electrodes and to which an electric potential lower than that supplied to the aforementioned electrodes is applied, and a compensating electrode disposed between the aforesaid electrodes and the mesh electrode thereby compensating the distortion at the marginal portion of the aforementioned electrostatic doublet concave lens to eliminate the distortion of a picture.

This invention is also intended to obtain a cathode ray tube comprising an electrostatic doublet concave lens composed of two electrodes including at least one cylindrical electrode and of a mesh electrode which is disposed between the the said electrodes and to which an electric potential lower than that supplied to the aforementioned electrodes is applied, and a compensating electrode arranged between the aforesaid electrodes and the mesh electrode to form an electrostatic convex lens at marginal portion of the aforesaid electrostatic lens by selecting suitably the relative dimension of the compensating electrode and the distance between the cylindrical electrode and the mesh electrode, thereby compensating the distortion at the marginal portion of the electrostatic doublet concave lens to eliminate the distortion of a picture.

Figures 5, 6, 7, 8, 9:
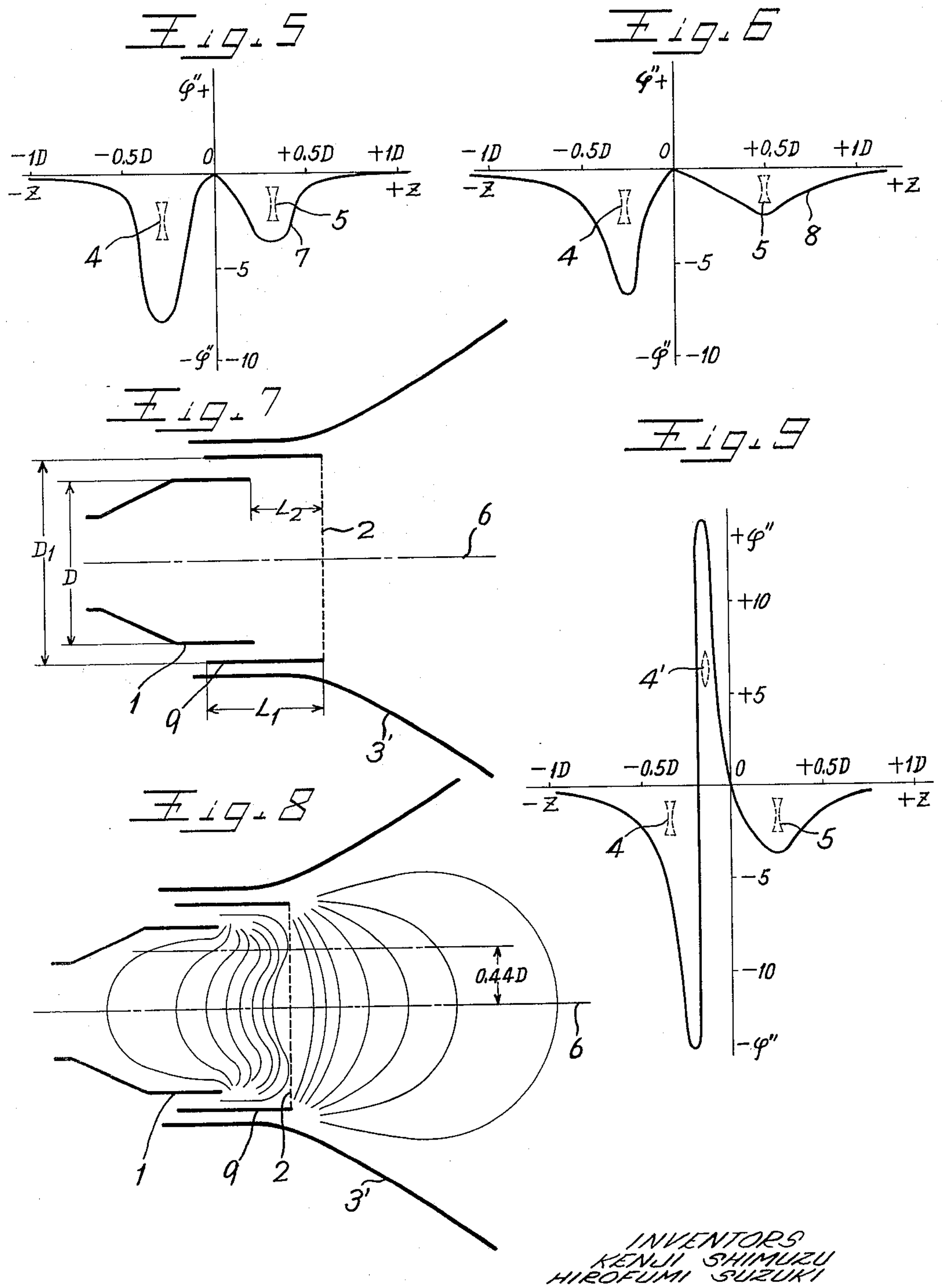
FIGURE 5 is a second differential coefficient curve for the electric field distribution shown in FIGURE 4 along a line parallel to and shifted from the center axis of the electrode structure.
FIGURE 6 is also a second differential coefficient curve along the center line of the electrode structure.
FIGURE 7 is an arrangement of electron beam scan-magnification electrodes, by way of example, of a cathode ray tube according to this invention.
FIGURE 8 shows its electric field distribution.
FIGURE 9 is a second differential coefficient curve of the electric field distribution shown in FIGURE 8, along a line parallel to and shifted from the center axis of the electrode structure.

FIGURE 7 is an embodiment of the cathode ray tube of this invention, in which a compensating cylindrical electrode 9 is provided coaxially on the axis of the focusing cylindrical electrode 1 and the mesh electrode 2 forming the aforesaid concave lens for the purpose of compensating the distortion at the marginal portion of the electrostatic concave lens. Namely, an electrostatic convex lens is additionally formed at the marginal portion of the electrostatic concave lens by selecting the diameter $D_1$ and the length $L_1$ of the cylindrical electrode 9, the distance between the electrodes 1 and 3' and the mesh electrode 2, their diameters, lengths and so on in accordance with electric potentials applied to these electrodes as will be hereinbelow explained, thereby compensating the distortion at the marginal portion of the electrostatic doublet concave lens. In this case, when the effective diameter of the electrode 1 is D, the distance $L_2$ between the end of the electrodes 1 and 2 is selected from 0.2D to 0.4D, the diameter $D_1$ of the compensating electrode 9 is so selected as to be larger than the diameter D of the electrode 1 and to be smaller than 1.6D, the length $L_1$ of the electrode 9 is selected long enough to fully cover the opening end of the electrode 1 and the electrode 9 is connected to the marginal portion of the mesh electrode 2, to which electrode 9 is applied an electric potential equal to that of the mesh electrode 2 but lower than those of the electrodes 1 and 3'. In a preferred embodiment of an 8 inch 90° reflection type cathode ray tube $D=17.0$ mm., $D_1=21.0$ mm. (1.24D), $L_1=10.0$ mm. (0.59D) and $L_2=5.5$ mm. (0.32D). In this embodiment, electric potential of 7 kv. and 1.6 kv. were applied respectively to the electrodes 1 and 3', to the mesh electrode 2 and to the compensating electrode 9. 3' is an electrode attached on the inner surface of the cone and is of equipotential with the phosphor screen. As a result of this an electric field distribution such as shown in FIGURE 8 was obtained. It will be seen that the electric field distribution established by the electrodes 1, 2 and 9 is different from that shown in FIG. 4, particularly at their marginal portions. Being based upon this electric field diagram, the second differential coefficient on an axis parallel to an axis 6 spaced from the center axis of each electrode at the distance of 0.44D is as shown by a curve 10 in FIGURE 9. It will be seen that the second differential coefficient changes at a place spaced from the mesh electrode 2 at a distance of about 0.2D, that is, the second differential coefficient becomes plus at this place, where the convex lens 4' is performed.

According to this invention as above described, the convex lens 4' is performed mainly at the marginal portion of the electrostatic concave lens 4 by selecting the structure of the electrodes and their relative dimensions as described above and the lens aberration in this kind of cathode ray tube heretofore used can be compensated, accordingly the distortion of a picture on a phosphor screen can be eliminated. In this case, the diameter of the compensating electrode 9 is required to be larger than the effective diameter of the electrode 1, but when the diameter of the electrode 9 goes beyond 1.6D the compensating convex lens effect is lost. Furthermore when the distance $L_2$ between the electrode 1 and the mesh electrode 2 is made smaller than 0.2D the convex lens effect cannot be obtained sufficiently, and in the case of the distance being larger than 0.4D the concave effect at the center of the electrodes falls and a desired scan-magnification of the electron beam cannot be accomplished. It was found that a stable compensating lens effect can be obtained by selecting the length of the compensating electrode 9 long enough to fully cover the opening end of the electrode 1 on the side of the mesh electrode 2. Practically in our embodiment in which the structure of the electrodes and their relative dimensions were selected suitably and electric potentials of 7 kv. and 1.6 kv. were applied respectively to the electrodes 1 and 3' and to the electrodes 2 and 9, a distortionless and clear picture can be obtained and the width of the picture was substantially twice that produced by a cathode ray tube having no scan-magnification arrangement and the deflection power of the above embodiment was reduced to ⅓ as compared with that required by the latter cathode ray tube.

The above description has been made in connection with the case where the compensating electrode 9 is connected to the mesh electrode 2 on the side of the electrode 1, but it will easily be seen that the compensating electrode 9 is formed on the side of the electrode 3 or 3' or it is formed separate from the mesh electrode 2 and suitable electric potentials are applied to the respective electrodes thereby obtaining the same action and effect.

In the above embodiment, although explanation has been mainly made in connection with the concave lens system having substantially flat mesh electrode 2, this invention can be equally applied to a concave lens system in which a second mesh electrode is so disposed in opposition to the electrode 1 and closely to the mesh electrode 2 that the second mesh can catch secondary electrons which will be emitted from the mesh electrode 2. In this case the compensating electrode can be connected to the second mesh electrode and aforesaid distance between the mesh electrode 2 and the electrode 1 in the former example can be considered as the distance between the second mesh electrode and the electrode 1 in the latter example. To the second mesh electrode is usually applied a potential lower than that of the other mesh electrode by about several hundred volts.

Moreover, potentials to be respectively applied to the cylindrical electrode 1, accelerating electrode 3 or 3', flat mesh electrode and compensating electrode 9 are, of course, so selected that the scan-magnification effect is performed with distortionless condition in their predetermined dimensions and relative distances. It will be, however, noted that the potentials of the compensating electrode 9 and mesh electrode can be maintained substantially 12.5% to 40%, preferably 20% of the potentials applied to the cylindrical electrode 1 and the accelerating electrode 3 or 3' irrespective of the largeness (16-inch or 8-inch, for example) or deflection angle (114° or 90°, for example) of the electron beam.

It will be apparent that many modifications and variations may be effected without departing from the scope of novel concepts of this invention.

What is claimed is:

1. In a cathode ray tube of the scan-magnification type including an electron source, a screen positioned to be bombarded by the electrons from said source, a cylindrical electrode, an accelerating electrode, and a screen electrode interposed between said cylindrical electrode and said accelerating electrode, the combination of said cylindrical electrode, accelerating electrode, and screen electrode being positioned between said source and said screen and being supplied with sufficient potential differences to provide two electrostatic concave lenses, the improvement which comprises a compensating cylindrical electrode concentric with said cylindrical electrode, said compensating electrode being at a substantially lower potential than said cylindrical electrode and positioned to form an electrostatic convex lens between said electrostatic concave lenses.

2. The tube of claim 1 in which said compensating cylindrical electrode has a diameter larger than the effective diameter of said cylindrical electrode but less than 1.6 times said effective diameter.

3. The tube of claim 2 in which said compensating cylindrical electrode circumscribes at least a portion of said cylindrical electrode and projects therebeyond a distance of from 0.2 to 0.4 times the effective diameter of said cylindrical electrode.

4. The tube of claim 1 in which one end of said compensating cylindrical electrode is closed off by said screen electrode.

References Cited by the Examiner

UNITED STATES PATENTS

| | | | |
|---|---|---|---|
| 2,213,688 | 9/1940 | Broadway et al. | 313—85 X |
| 2,277,414 | 3/1942 | Ramo | 313—85 X |
| 2,719,243 | 9/1955 | Hoagland | 313—85 X |
| 2,971,108 | 2/1961 | Dickinson et al. | 315—16 X |
| 2,981,864 | 4/1961 | Burdick et al. | 313—82 X |
| 3,035,198 | 5/1962 | Skoyles | 313—76 |
| 3,082,342 | 3/1963 | Pietri | 313—95 |
| 3,133,220 | 5/1964 | Whyman | 313—85 |
| 3,154,710 | 10/1964 | Parker. | |

ROBERT SEGAL, *Primary Examiner.*

ARTHUR GAUSS, GEORGE N. WESTBY, C. O. GARDNER, *Examiners.*